Nov. 23, 1965 K. L. JOHNSON 3,219,790
FASTENER AND ELECTRODE THEREFOR
Filed July 30, 1964
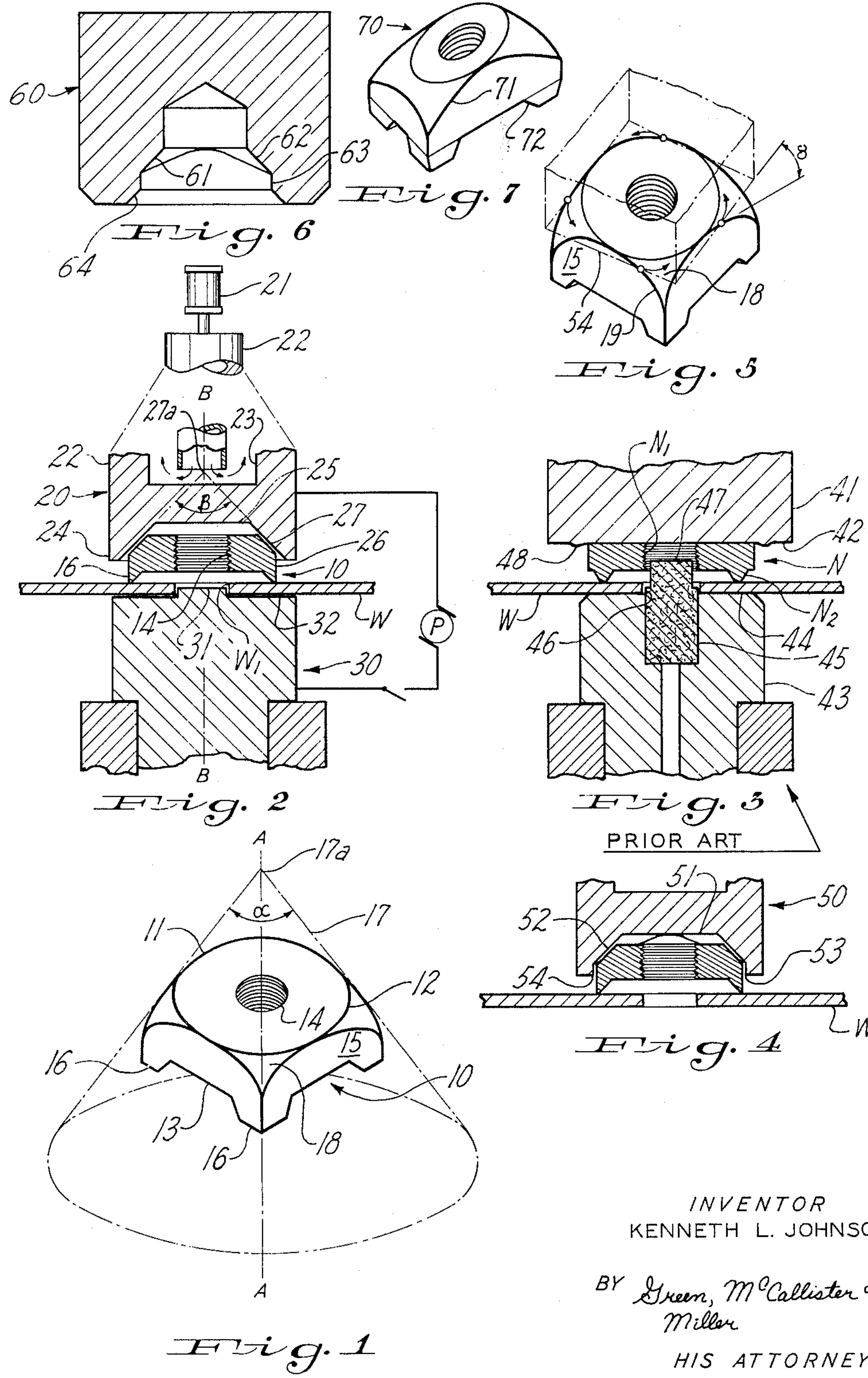
INVENTOR
KENNETH L. JOHNSON
BY Green, McCallister & Miller
HIS ATTORNEYS United States Patent Office 3,219,790
Patented Nov. 23, 1965

3,219,790

FASTENER AND ELECTRODE THEREFOR

Kenneth L. Johnson, 951 Garden City Drive, Monroeville, Pa.

Filed July 30, 1964, Ser. No. 386,147
19 Claims. (Cl. 219—93)

The weld fastening element of this invention has a tapering convex surface for self-location and orientation by a mating electrode. The electrode is also constructed to resist deformation presently encountered in the art due to repeated impact and to produce superior, more uniform welds under automated and semi-automated conditions.

Fasteners such as weld nuts and other weld fastening elements are increasingly employed by industry for fastening sheet metal articles which are themselves too thin to support threaded connectors. In fact, weld fastening elements have become the rule in the automotive and major appliance industries which represent a substantial portion of the manufacturing economy.

In addition to providing the basic function of fastening sheet metal parts, weld fastening elements contribute substantial assistance to rapid, high-quality assembly methods, including automated assembly lines. A weld fastening element accurately located by automatic equipment dictates an accurate location of mating parts assembled thereto with standard bolts. Weld fastening elements permit an efficient blind hole assembly process inasmuch as they are prevented from rotating by the work piece to which they are attached. Furthermore the assembly of the weld fastening elements themselves onto their base metal work pieces is particularly adaptable to high volume automation procedures.

Existing weld fastening elements and particularly weld nuts have met with some difficulty in high volume automated applications, due to difficulty in their positioning and orientation by high speed equipment. Also the welding characteristics of prior, weld nuts are inconsistent and hence unsatisfactory for many automatic processes in that there is a lack of uniform welding and of true alloying of the weld projections with the work piece material; the connection at best being a forged blacksmith weld which has less strength than a true alloyed weld nugget.

In addition to the foregoing limitations due to the difficulties in the weld nut itself, automatic use of a weld nut is limited by factors such as locating-pilot wear and wear on the nut engaging electrode, both of which require considerable down-time for maintenance, replacement and repair. Conventional weld nuts are located by a non-conducting pilot pin or projection that receives an oversized open portion of a base metal work piece and also receives the threaded opening of the nut to align it with the open portion of the work piece. The pilot pin must be made of a non-conducting and hence nonmetallic material (usually fiber or thermosetting plastic) so as not to shunt-out or otherwise interfere with the flow of electrical current between the parts to be welded. The locating pin wears rapidly and must be replaced in some applications as frequently as every two hours of continuous service. It is standard practice to employ flat welding electrodes that engage the conventionally flat upper surface of the weld nut and apply pressure thereto during the welding. In operation, the electrode operates in a pounding fashion as it applies the weld elements to their respective work pieces. The flat surface of such conventional electrodes soon develops indentation-like distortions from the Brinelling effect of repeated pounding, which after a period of time, begin to interfere with the accuracy and electrical conductivity of the mechanism requiring the electrode to be replaced or re-surfaced.

Successful automation of an assembly process requires elaborate coordination of various individual sub-processes, each of which has some degree of flexibility or inflexibility for its successful accomplishment. Obviously the more flexible the sub-processes as to their control, tolerance ranges, etc., the easier they adapt to automation. Welding time is one critical factor to be considered in establishing an automated weld nut schedule. This factor is limited primarily by the rate at which heat can be released at the point of the weld without distorting the weld nut or the thin base metal work piece, or melting a zinc or cadmium plating with which many weld nuts are coated for protective reasons.

One particularly troublesome aspect of existing mass produced weld nuts is the nut body distortions producing a lack of parallelism occurring as a practically unavoidable incidence to their manufacture. Lack of parallelism causes a weld nut to cant with respect to a flat electrode and initial contact therebetween occurs on an edge located line rather than a plane as desired. Obviously it is difficult to obtain any sort of uniform welding characteristics under these conditions. Furthermore, the small contact area between the weld nut and the electrode causes arcing and pitting that further reduces electrode life. Severe canting of the weld nut, of course, will make later automated steps of an assembly impossible because of excessive improper directioning of the threaded nut hole.

In view of the foregoing state of the art, it has been an object of my invention to devise a weld fastening element construction that is self-locating so as to completely eliminate the need for a nut locating pilot pin.

Another object of my invention has been to devise a self-orienting weld nut construction to permit the use of square or rectangular weld nuts or fastening elements meeting existing industrially accepted standards or special strength considerations without sacrificing valuable space that would otherwise be required to allow for axial misorientation.

A further object of my invention has been to devise a weld fastening element and welding electrode therefor that are particularly adaptable to automated assembly processes by reason of a high degree of flexibility, wide range of welding parameters, a low maintenance and down-time factor, and a high capability for reproducible high accuracy.

Another important object of my invention has been to devise and develop a weld fastening element construction that will consistently produce a true alloyed weld nugget under ordinary production conditions.

These and other objects of my invention will become more apparent to those skilled in the art upon reading the following description of the inventive concepts of my invention, some illustrative embodiments thereof and the appended claims.

One phase of my invention involves the provision of a weld nut having a convex tapered surface and an electrode having a concave tapered surface that is substantially complementary to the weld nut tapered surface. The tapered surfaces can be any appropriately regular surface-of-revolution that has an apex. For example, a cone, sphere, paraboloid, ellipsoid or hyperboloid are all satisfactory, as are similar configurations which are not necessarily mathematically definable.

The mating tapered surfaces of the nut and electrode have the property of seeking a mutually centered relationship when forced together. Thus a nut, in approximately its desired location, will be accurately centered by the electrode as it moves into engagement therewith, to perform the welding operation. Proper self-locating performance requires that the taper angle be high enough to produce effective sliding force that will overcome frictional resistance. On the other hand, if the taper angle is too high, the range of available centering movement will be too severely limited and also excessive radial forces will be developed in the nut-engaging electrode during the welding operation. The surfaces-of-revolution should be tangent, at the nut surface, to a coaxial cone having an apex angle substantially within the range of 70° to 100°, and for optimum performance, of substantially 90°.

The use of a convex nut with a concave electrode, as thus described, is to be contrasted with the use of a concave nut and a convex electrode, which inherently would be inferior in its performance of self-locating functions. In the case of a convex nut that is slightly out of position, the concave electrode will engage an upper edge of the nut and exert a cam pushing force on the nut toward the nut center. The resultant force exerted will tend to cause a rotation of the center of the nut downwardly about a horizontal axis. However, any such downward rotation is completely resisted by the work piece on which the nut rests. On the other hand, in the case of a concave nut that is slightly out of position, a convex electrode will engage an upper edge of the nut and tend to pull the nut into position. The resultant force exerted will tend to cause a rotation of the center of the nut upwardly about a horizontal axis thus tending to cant the nut, and in extreme cases could cause the nut to be popped out of position altogether. The tendency towards canting of the nut will not only upset the required proper alignment of the nut, but will reduce the self-positioning efficiency of the system due to asymmetrical distribution of the electrode pressure onto one edge of the nut.

Another phase of my invention involves a modified electrode construction that causes a significant degree of self-orientation of polygonal weld nuts provided with a tapered surface as described above. For this phase of my invention I provide a cavity in the electrode having a mouth portion that is geometrically similar to the weld nut to be applied. The tapered surface lies deeper in the cavity and performs the function of final positioning. The side edges of the mouth portion engage curved edge portions or camming lines of a polygonal nut constructed in accordance with my invention and cam the nut into proper orientation. The effectiveness of this phase of my invention is enhanced by providing a chamfered lip portion extending around the periphery of the mouth so that the curved camming lines of the nut are engaged by a surface rather than by a simple edge.

A further phase of my invention involves the construction of the welding electrode so as to minimize its deformation from repeated use and thus decrease the downtime required for the welding machinery. I have discovered that an electrode having a concave nut-receiving working portion is subject to much less deformation, due to the Brinelling effect of repeated pounding, than conventional electrodes having flat or planar working surfaces, and especially convex electrodes as have been proposed in some instances. The concave electrode construction of my invention provides inherently a large amount of confining mass throughout which the tendency for deformation can be distributed. Considering the planar working surface of the prior art, it will be seen that downward force on a nut of limited area can and does cause a cold flow of electrode material laterally outwardly causing an eruption of material around the periphery of the nut contact area. In contrast with this, consider the concave electrode of my invention wherein sidewise or lateral forces from the pressure incident to the welding action are resisted by a large amount of backing material that surrounds the inwardly facing nut engaging working surface. Of course, proper functioning of this phase of my invention requires that the force exerted on the weld element be by a surface within the concavity. Preferably the force is exerted by a tapered surface, i.e., one that extends at least partially in the direction of the force applied.

In addition to the foregoing basic phases or novel concepts involved in my use of a concave welding electrode and a convex weld fastener element, I have determined that several significant secondary benefits are obtained by my invention. The relatively enlarged contacting area provided by mating concave-convex surfaces together with the shortened electrical path to the welding projection caused by a tapering of the weld nut to its outer periphery produces an improved weld by maximizing the electrical heating efficiency at the welding point. Indeed, the improved welding efficiency is such that it is possible, with my invention, to obtain a true alloying action that produces a weld nugget of mixed material of the work piece metal and weld element projection metal. Conventional weld nuts produce only a blacksmith type weld that involves penetration by the molten material of the weld projection into the work piece metal without much mixing and hence with relatively low strength.

I have also determined that cooling of the weld nut during the welding operation is greatly enhanced by encompassing it in a large mass of electrode material as provided by my concave electrode. Water-cooled welding electrodes have been known in the art, but the efficiency of their operation, so far as the weld element and work piece are concerned, has, in the past, been very limited by the inability to transfer much heat rapidly from the weld element. In my invention, the weld element is surrounded by the relatively cool electrode and the electrode is much closer to the work piece. Consequently, more heat can be generated faster in the area of the weld without overheating either the weld nut to distort its threads or melt its coating, if any, or the base metal piece to distort its shape.

Another secondary benefit of my invention is the tolerance to lack of parallelism in the weld element which it provides. It will be recognized that in the case of conventional flat top weld nuts and flat welding electrodes, any lack of parallelism of the nut upper and lower surfaces will reduce the theoretical contact between the electrode and the weld nut from a surface-to-surface contact, to a line contact that is necessarily non-equidistantly located with respect to the weld projections. On the other hand, where the weld element and electrodes are provided with complementary convex-concave surfaces which surfaces are surfaces-of-revolution as described above, lack of horizontal parallelism in the weld element will reduce the theoretical surface-to-surface contact between the weld element and the electrode to a line contact, but the line will always extend a full 360° around the weld element if the weld element has sufficient surface area. The relatively low degree of lack of parallelism found in mass produced weld nuts is such that a relatively small amount of conical surface will cover or intercept the arc of the line contact between the non-aligned electrode and weld element. In any event, the line contact will engage that portion of the weld element adjacent each of the welding projections for all polygonal weld nuts having corner located weld projections. Furthermore, elastic deformation of the weld element and electrodes due to compression force therebetween will produce a much greater surface contact between the electrode and the weld element than does the deformation of one edge or corner of a conventional weld nut and welding electrode. It will be recognized that in addition to the increased electrical efficiency provided by my invention, in the event of lack of parallelism, the full 360° contact between the electrode and the weld element insures a substantially symmetrical or axial set-down force as opposed to the asymmetrical one edge located force incident to welding non-parallel conventional flat weld nuts. Thus all welding projections in the weld nut of my invention will receive substantially the same force and electrical current regardless of slight imperfections to insure a continuously repetitive accurate weld.

These phases or inventive concepts of my invention will be more completely understood by those skilled in the art upon reading the following description of some specific illustrative embodiments of my invention wherein reference is made to the accompanying drawings of which:

FIGURE 1 is a perspective view of a self-locating weld nut constructed in accordance with my invention;

FIGURE 2 is an elevational cross section showing a weld nut of my invention as placed in a welding position within an electrode assembly of my invention;

FIGURE 3 is an elevational cross sectional view of a conventional weld nut and electrode therefor illustrating the prior art for purposes of comparison;

FIGURE 4 is a vertical cross sectional view of a modified electrode in cooperative relationship with a weld nut constructed in accordance with my invention;

FIGURE 5 is an explanatory view somewhat in diagrammatic form illlustrating the operation of the modified electrode of FIGURE 4;

FIGURE 6 is a vertical cross sectional view of a different modified electrode constructed in accordance with my invention; and FIGURE 7 is a perspective view of a non-conventional weld element constructed in accordance with my invention to illustrate the breadth thereof.

Turning now more specifically to the drawings, in FIGURE 1 there is shown a fastener such as a weld fastening element or nut 10 constructed in accordance with my invention. The nut 10 can be basically like any other conventional weld nut in that it has a body portion or strength producing mass 11 defining first and second, upper and lower major surfaces, planar end faces or areas 12 and 13 respectively, and a central axis A—A along which a threaded bore 14 extends. The body portion 11 also includes a plurality of side walls, surrounding or connecting side faces or edges 15 defining a polygonal (usually rectangular) periphery and an integrally formed means such as a plurality of downwardly extending weld projections or feet 16 for securely connecting the nut 10 to a work piece. The weld projections 16 are located preferably adjacent the periphery of the body portion 11 at the corners thereof. As shown in FIGURES 1 and 5, the body of the nut 10 has an inverted U-shape between its corners, as viewed from its side faces. Also as shown, its weld projections 16 extend from the planar bottom end face 13 adjacent the side faces as planar continuations of the side faces and are of equal height. More particularly, the weld projections 16 are shown extending from side faces at the corners of the nut body as angle-shaped continuations thereof. Also, as illustrated in FIGURES 1, 2 and 4, the weld projections 16 have sharp edges that lie along and are continuations of the side faces of the nut body.

The nut 10 differs from conventional weld nuts in that a convex surface-of-revolution 17, having an apex **17*a* lying on the axis A—A is superimposed on its upper surface 12. Axially symmetrical portions of the surface-of-revolution 17 appear on the nut 10 as segments 18 which, in the case of a polygonal nut, will always be positioned over the corners thereof. As mentioned above, the surface-of-revolution can be one of many regular surfaces such as a sphere, paraboloid, ellipsoid, hyperboloid or even surfaces that cannot be easily mathematically defined. I prefer to employ a simple conical surface because of its ease of formation and accordingly the surface-of-revolution 17 shown in FIGURE 1 is a cone. The apex angle $\alpha$ of the cone is within the range of 70° to 100° for the operational considerations stated above and performance is optimal at 90°. In the event that a surface-of-revolution 17 other than a cone is employed, such other surface should be tangent, at the segments 18, to a cone having an apex angle substantially within the range of 70° to 100° for the same reason. The segments 18 may be made smaller or larger as desired in accordance with the needs of the individual nut, taking into consideration the practical limitations necessary to perform the functions of the invention. As will be noted, the segments 18 represent portions which slope radially-outwardly from the planar face area of the top or upper end face 12 and with respect to and remotely of the threaded bore 14, and downwardly into the side faces in substantially opposed central alignment with the weld projections 16**, so as to define the tapered convex top portion.

Turning now to FIGURE 2, there is shown the operative elements of a welding machine including an upwardly located vertically movable electrode 20 having a conventional motor means such as an air cylinder 21 connected thereto, a downwardly located stationary electrode 30 and a selectively operable, electrical potential supply P connected to the electrodes 20 and 30. The electrode 20 has an electrically conductive body portion 22 containing cooling water passage means or ducting 23 formed internally thereof, and a working face 24 that includes a downwardly concave weld element-receiving cavity 25 that is centered about an axis B—B. The cavity 25 is surrounded by an annular or continuous reinforcing shoulder portion 26 that absorbs radial outward forces imposed upon the cavity surface. The weld element receiving cavity 25 includes a downwardly facing axially symmetrical portion 27 of a surface-of-revolution that can be any appropriate surface-to-revolution as mentioned in conjunction with FIGURE 1. In FIGURE 2 the portion 27 is simply a complete frustum of a cone having an apex **27*a*** lying on the axis B—B and defining an apex angle $\beta$ substantially within the range of 70° to 100°.

The stationary electrode 30 is made of an electrically conductive material and has integrally formed pilot shoulder or workpiece locating means 31 that extends outwardly from an upwardly facing working surface 32.

Also, shown in FIGURE 2 is a typical sheet metal work piece W having a pre-formed slightly oversized bolt hole $W_1$ therein, and a weld nut 10 substantially as shown in FIGURE 1 positioned in place thereon. From FIGURE 2 it can readily be seen how the aligned upper and lower electrodes 20 and 30 automatically align the bolt hole or aperture $W_1$ of the work piece W with the threaded bore 14 of the nut 10. Moreover, it can be seen how the upper electrode 20 encompasses force receiving surfaces of the nut 10 to distribute the welding force through a large mass of electrode material to minimize Brinelling type distortion and also provide highly efficient cooling of the nut. Furthermore, the very close-coupled relationship between the electrodes 20 and 30 and the weld projections 16 is apparent from FIGURE 2.

FIGURE 3 shows a conventional weld nut and welding apparatus which is representative of the prior art for purposes of comparison. The conventional welding apparatus includes an upper, vertically movable metallic electrode 41 having a downwardly facing flat or planar welding surface 42; and a stationary metallic lower electrode 43 having a flat upwardly facing working surface 44 and a removable, electrically-non-conductive pilot insert 45 that has a work-piece-holding shoulder portion 46 and a nut-locating pin portion 47. A sheet metal work piece W is shown located by the holding shoulder 46 and a conventional flat weld nut N having a threaded bore $N_1$ and weld projections $N_2$ is shown located by the pin 47 in approximately an aligned relationship with the work piece W. As mentioned above, prior art welding setups like that of FIGURE 3, require frequent shut-downs for the replacement of the relatively soft non-conductive pilot insert 45 which is usually made of Bakelite or a hard fiber, and replacement or resurfacing of the upper electrode 27 which tends to distort due to repeated Brinelling effect of the pounding on its flat surface. The distortion appears as eruptions 48 which result in an uneven electrode surface. It will be apparent that a welding arrangement like that of FIGURE 3 cannot orient the weld nut N about its vertical axis nor can the weld nut N be as efficiently cooled and welded as in the set-up shown in FIGURE 2.

Turning now to FIGURES 4 and 5, there is shown a modified upper electrode 50 that is especially designed to provide orientation of polygonal weld fastener elements about their vertical axis. The nut in FIGURES 4 and 5 is identical to the nut 10 shown in FIGURE 1. The modified electrode 50 includes a downwardly facing weld element-receiving cavity 51 that includes a portion 52 of a surface-of-revolution substantially complementary to the surface of revolution 17 that is superimposed on the nut 10 as described in connection with FIGURE 2. The cavity 51, however, also includes a mouth formed by peripheral side edges 53. The edges 53 define a polygonal edge, lip or downward periphery 54 that is geometrically similar to the periphery of the weld nut 10 to provide means for orienting the nut 10 about its axis. In FIGURE 5 the nut 10 is shown in perspective with the lip 54 of the electrode 50 superimposed thereon and skewed at a small angle $\gamma$ to illustrate the interaction of the lip 54 with a camming line 19 formed by the interaction of the side walls 15 with the segments 18. The interaction causes the nut 10 to rotate about its vertical axis into alignment with the lip 54 as shown by the arrows. By employing an electrode constructed in accordance with FIGURES 4 and 5 and a square nut having a 90° cone superimposed thereon, I find that automatic orientation of the nut can be accomplished over a range of as much as 10° initial misorientation.

In FIGURE 6 an upper vertically movable electrode 60 is shown embodying a still further modification of the basic concept of my invention. The electrode 60 includes a downwardly open weld element-receiving cavity 61 including a surface-of-revolution 62 substantially complementary to that superimposed on the nut 10 as described in connection with FIGURE 2. Also included in the cavity 61 are nut receiving straight side edges 63 that approximate the periphery of the nut 10 and terminate in their downward outward end in a peripherally extending, chamfered lip or tapered lead portion 64. The chamfered lip portion 64 makes the initial contact with the nut camming line 19 and increases the range of such orientation by 50% or, in other words, makes it possible to orient square weld elements within up to 15° misorientation.

In FIGURE 7 there is shown a non-conventionally shaped weld element 70 illustrating the breadth of the concept of my invention. The weld element 70 is oblong (rectangular) in plan view and is domed to provide a relatively large amount of surface of revolution 71 for mating with an appropriately configured welding electrode. The weld element 70 has weld projections 72 at its corners and includes a relatively large amount of material, both for strength considerations. It will be appreciated that a conventional weld element designed to meet the requirements of the element shown in FIGURE 7 would be especially subject to the problems caused by lack of parallelism, misorientation about the vertical axis, and weld nut cooling, whereas, the problems are all completely and economically solved by the construction of the weld element and welding electrode in accordance with my invention.

As illustrated in the drawings, the side faces of the nut body are substantially planar and thus, perpendicular to the planar major top and bottom end faces or areas 12 and 13, and the sloped or the declining surfaces 18, in effect, bisect the corners of the nut at the point of intersection of the two portions of each weld projection 16 that are defined by the continuations of such corners. The sharp edges of the weld projections, as shown, lie on the plane of the side faces or constitute planar continuations thereof at the corners of the polygonal shaped nut body. The taper of the concave portion 27 of the upper welding part or head 20 that slopes in a downwardly-outwardly flaring or diverging manner (as shown particularly in FIGURE 2) is complementary with the slope or taper represented by the segments 18 of the nut body, such that an adjustable centering of the nut body within the cavity of the welding part 20 is accomplished when the welding part is moved relatively towards the lower welding part 30 into a welding position.

From the foregoing description of the objects of my invention, the phases or concepts by which the objects are accomplished, and from the foregoing illustrative embodiments thereof, those skilled in the art will recognize that I have devised and developed an improved weld element and electrode therefor that is particularly adapted for automatic and semi-automatic processing due to its versatility and flexibility in application, simple auxiliary equipment required, and high tolerance to off designed conditions of various pieces of equipment. While some specific embodiments have been shown herein for purposes of illustration, those skilled in the art will recognize that many changes and modifications can be made without departing from the basic concepts and spirit of my invention. Having thus described my invention in full detail, I claim:

1. In a self-locating weld nut adapted to rest in a welding position within a welding head having a tapered outwardly diverging concave portion and in alignment on an apertured substantially planar work piece to which it is to be secured and which work piece is supported and aligned on an opposed welding head; a nut body provided with a pair of opposite top and bottom end faces, with connecting side faces perpendicular to said end faces, and with a thread bore; said top and bottom end faces having relatively planar major face areas about said thread bore, said thread bore defining a central axis extending through said nut body between said end faces, spaced-apart integral weld projections extending from said bottom end face adjacent said side faces to position said nut body on the work piece, said top end face having portions sloping radially-outwardly from its said planar face area and with respect to and remotely of the thread bore and downwardly below said planar face area into said side faces in substantially opposed central alignment with said weld projections for defining a tapered convex top portion to fit in an adjustably-centering substantially complementary manner within the tapered concave portion of the first-mentioned welding head, and said convex top portion being substantially symmetrical with a surface of revolution of the axis of the thread bore and being tangent to a coaxial conical surface of projection having an apex angle of 70° to 100°.

2. In a self-locating weld nut as defined in claim 1 wherein said convex top portion is symmetrically balanced on said top end face.

3. In a self-locating weld nut as defined in claim 1 wherein, said weld projections are equally spaced with respect to each other about said bottom end face, said sloping portions of said top end face are equally spaced with respect to each other about said top end face, and said convex tapered top portion is of conical shape.

4. In a self-locating weld nut as defined in claim 1 wherein said weld projections are of substantially equal height and extend as planar continuations of said side faces.

5. In a self-locating weld nut as defined in claim 1 wherein said side faces are connected with each other by corner edges, and said sloping portions of said top end face incline from its said planar surface area into said corner edges.

6. In a self-locating weld nut as defined in claim 1, wherein said nut body is of polygonal shape along said side faces to define corners therebetween, and said weld projections extend from said side faces at the corners as angular-shaped continuations thereof.

7. In a self-locating weld nut as defined in claim 6 wherein said sloping portions of said top end face bisect the corners of said nut body in opposed alignment with said weld projections.

8. In a self-locating weld nut as defined in claim 6 wherein, said weld projections are planar continuations of said side faces, and said weld projections have sharp edges that lie along and are continuations of said side faces.

9. A self-locating weld nut having a pair of opposite relatively wide top and bottom end faces, with connecting substantially planar side faces substantially perpendicular thereto, and with a thread bore extending therethrough between said top and bottom faces to define a central axis, said nut body being of polygonal shape, said top and bottom end faces having major substantially planar surface areas about and extending from said thread bore, weld projections extending integrally from the planar surface area of said bottom end face as planar continuations of said side faces at the corners of said nut body to position said nut body on a work piece, said upper end face having corner face areas that are spaced from and extend radially-outwardly with respect to the thread bore and downwardly from the planar surface area into the side faces at the corners and in centrally substantially opposed alignment with said weld projections, said top end face being of tapered convex shape and rounded along said corner face areas to define a self-locating surface, said top end face being substantially symmetrical with a surface of revolution of the central axis defined by said thread bore and being tangent to a coaxial conical surface of projection having an apex angle of 70° to 100° to adjustably-fit within a substantially complementary concavity of a welding head, and said nut body having an inverted U-shape between its corners as viewed from said side faces.

10. A self-locating weld nut as defined in claim 9 wherein, said top end face is of conical shape thereabout along said corner face areas, and each of said weld projections is of angular shape and terminates in angular-shaped sharp bottom edges at the planar continuations of said side faces at the corners of said nut body.

11. An electrode head for locating and weld-securing a weld element having a tapered convex end portion on a work piece which comprises, an electrically-conductive longitudinal body having a working face provided with an outwardly-flared concave portion centered about the longitudinal axis of said body for receiving and adjustably-centrally-locating the tapered convex end portion of the weld element therein, and said concave portion being axially-symmetrical of a surface of revolution about said axis and having an apex angle within a range of about 70° to 100°.

12. An electrode holder as defined in claim 11 for a weld element having polygonal sides wherein, said cavity portion has a peripheral portion about its mouth that defines a continuous polygonal surface to extend about the polygonal sides of the weld element when the weld element is located within said cavity portion.

13. Welding apparatus for securing a weld nut having a top end face provided with a tapered convex self-locating area defined by spaced-apart radially-outwardly-declining portions with surrounding side faces, with a bottom end face provided with spaced-apart weld projections extending therefrom in opposed alignment with said radially-outwardly declining portions and with a central thread bore, in an aligned position on a relatively planar work piece which comprises, a pair of upper and lower electrically-conductive opposed welding parts, said upper part having an open outwardly-flared cavity portion that is adapted to adjustably-receive and that is complementary with the convex self-locating area of the weld nut, the lower part having means for supporting the work piece in an aligned position thereon with the weld projections of the nut in abutment on the work piece, said cavity portion being axially symmetrical of a surface-of-revolution about a central axis of the weld nut and having an apex angle of about 70° to 100° to cooperate with the tapered convex self-locating area of the weld nut to accurately locate the weld nut therewithin and with respect to the work piece.

14. Welding apparatus as defined in claim 13 wherein said upper welding part has means for cooling it during its utilization.

15. Welding apparatus as defined in claim 13 wherein said cavity portion is of cone shape.

16. Welding apparatus as defined in claim 13 wherein said cavity portion is constructed to enclose the top end face of the weld nut and to project along and about adjoining portions of the surrounding side faces of the weld nut.

17. Welding apparatus as defined in claim 13 for an apertured work piece wherein said lower welding part has a projection to fit within the aperture for aligning the work piece thereon.

18. Welding apparatus as defined in claim 13 for a weld nut whose upper end face is substantially planar, whose connecting sides are of polygonal shape, whose self-locating convex area slopes from the planar upper end face into corner edges of the surrounding side faces and for a work piece having an aperture therein, wherein, said cavity portion is constructed to extend along and is of polygonal shape adjacent the surrounding side faces of the weld nut, said lower welding part has means extending into the aperture of and for aligning the work piece thereon, and means is provided for moving said welding parts towards each other and for applying electric current of opposite potential thereto to weld-secure the weld nut to the work piece.

19. A method of securing a weld nut having an upper end face provided with a tapered convex portion, having a bottom end face provided with weld projections, and having connecting side faces and a threaded bore extending centrally therethrough, to a relatively planar work piece having a bore hole therethrough which comprises; providing a pair of opposed upper and lower electrically-conductive welding parts wherein the upper part has a tapered concave portion of complementary shape with the tapered convex portion of the weld nut, wherein the lower part is provided with means to project into the bore hole of the work piece, and wherein the tapered concave portion of the upper part defines an axially symmetrical segment of a surface-of-revolution coaxial with the axis of the weld nut to be positioned therein; supporting the work piece in an aligned relation on the lower part, placing the weld nut with its weld projections on the work piece and with its threaded bore in alignment with the bore of the work piece, moving the pair of welding parts towards each other and centrally self-aligning the tapered convex portion of the nut within the tapered concave portion of the upper part on an axis of revolution having an apex angle of about 70° to 100°, and applying electric current of opposite potential to the welding parts and fusing the weld projections of the weld nut to the work piece to thereby secure the weld nut with its threaded bore in axial alignment with the bore hole of the work piece.

References Cited by the Examiner

UNITED STATES PATENTS

| | | | |
|---|---|---|---|
| 2,105,139 | 1/1938 | Demboski et al. | 85—32 |
| 2,285,609 | 6/1942 | Pedersen | 219—93 |
| 2,387,905 | 10/1945 | Hoeh | 219—119 |
| 2,623,974 | 12/1952 | Prucha | 219—93 |
| 2,707,507 | 5/1955 | Tripp et al. | 151—41.7 |

RICHARD M. WOOD, *Primary Examiner.*